United States Patent [19]
Parker et al.

[11] Patent Number: 5,432,597
[45] Date of Patent: Jul. 11, 1995

[54] REMOTE CONTROLLED TRACKING SYSTEM FOR TRACKING A REMOTE-CONTROL UNIT AND POSITIONING AND OPERATING A CAMERA AND METHOD

[75] Inventors: Jeffrey L. Parker; David F. Sorrells; Jonathan D. Mix; Richard C. Looke, all of Jacksonville, Fla.

[73] Assignee: Parkervision, Inc., Jacksonville, Fla.

[21] Appl. No.: 196,774

[22] Filed: Feb. 14, 1994

Related U.S. Application Data

[63] Continuation of Ser. No. 875,078, Apr. 28, 1992, abandoned, which is a continuation-in-part of Ser. No. 530,999, May 31, 1990, Pat. No. 5,268,734, and Ser. No. 736,729, Jul. 26, 1991, abandoned.

[51] Int. Cl.$^6$ .......................... G01C 1/00; G01J 1/20; G05B 1/06; G02B 13/16
[52] U.S. Cl. .................. 356/139.06; 250/203.3; 250/206.1; 318/640; 348/169; 352/53
[58] Field of Search .............. 356/152, 139.06; 318/640; 250/203.3, 206.1; 352/53; 348/169

[56] References Cited

U.S. PATENT DOCUMENTS

| | | | |
|---|---|---|---|
| 4,239,356 | 12/1980 | Freudenschuss et al. | 354/23 |
| 4,816,860 | 3/1989 | Iida et al. | 354/402 |
| 4,855,838 | 8/1989 | Jones et al. | 358/229 |
| 4,905,315 | 2/1990 | Solari et al. | 318/640 |
| 4,945,367 | 7/1990 | Blackshear | 354/81 |
| 4,959,798 | 9/1990 | Gordon et al. | 364/513 |
| 4,974,088 | 11/1990 | Sasaki | 358/210 |
| 4,980,871 | 12/1990 | Sieber et al. | 318/649 |
| 5,008,804 | 4/1991 | Gordon et al. | 364/167.01 |
| 5,045,843 | 9/1991 | Hansen | 340/709 |
| 5,073,824 | 12/1991 | Vertin | 358/210 |

FOREIGN PATENT DOCUMENTS

| 191133 | 8/1988 | Japan | 358/125 |
|---|---|---|---|

*Primary Examiner*—Stephen C. Buczinski
*Attorney, Agent, or Firm*—Arthur G. Yeager

[57] ABSTRACT

The system includes improvements to a remote tracking system for the control of the field of view of a camera. The system provides for improved motor control for PAN and TILT functions and expanded modes of operation in both the automatic and manual operation of the system. These improvements also include several tracking response and command programs for control based upon the error between the desired position of the camera field of view and its actual position. In addition, a universal learning remote unit is provided to learn commands from the IR remote unit for those cameras that have such features.

52 Claims, 13 Drawing Sheets

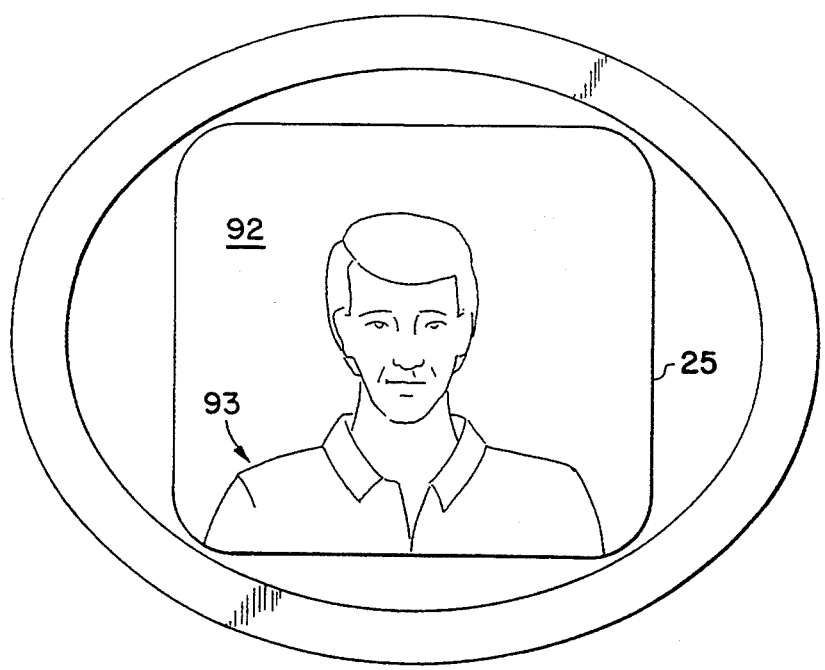
FIG 7
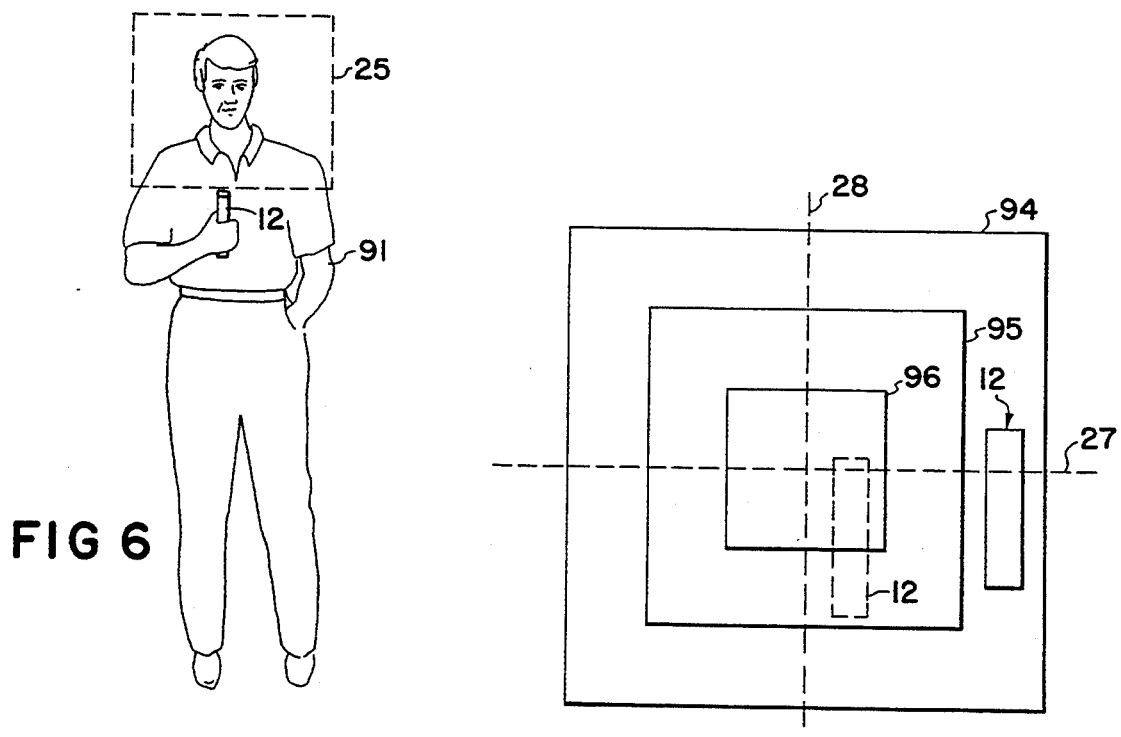
FIG 6
FIG 8

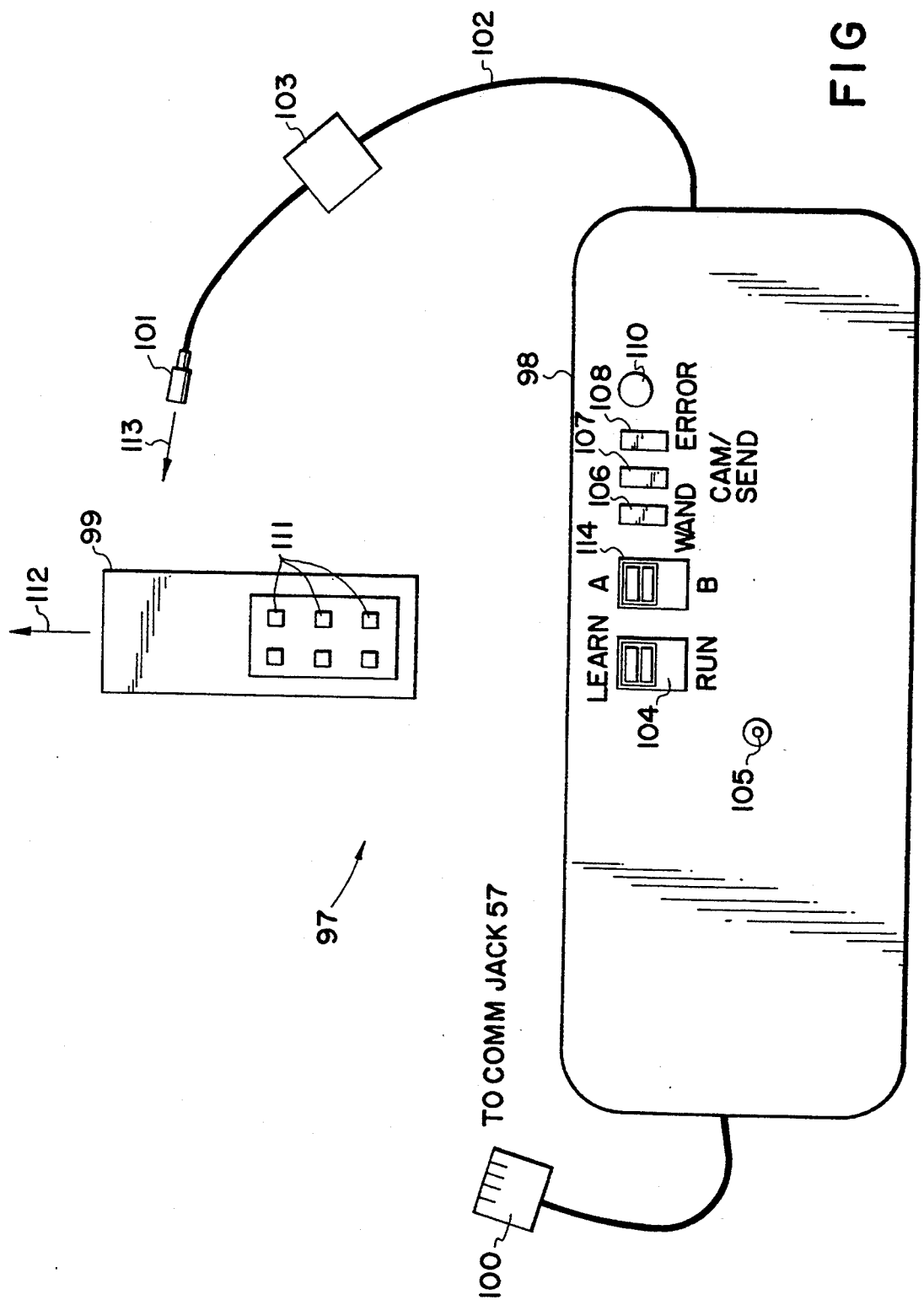

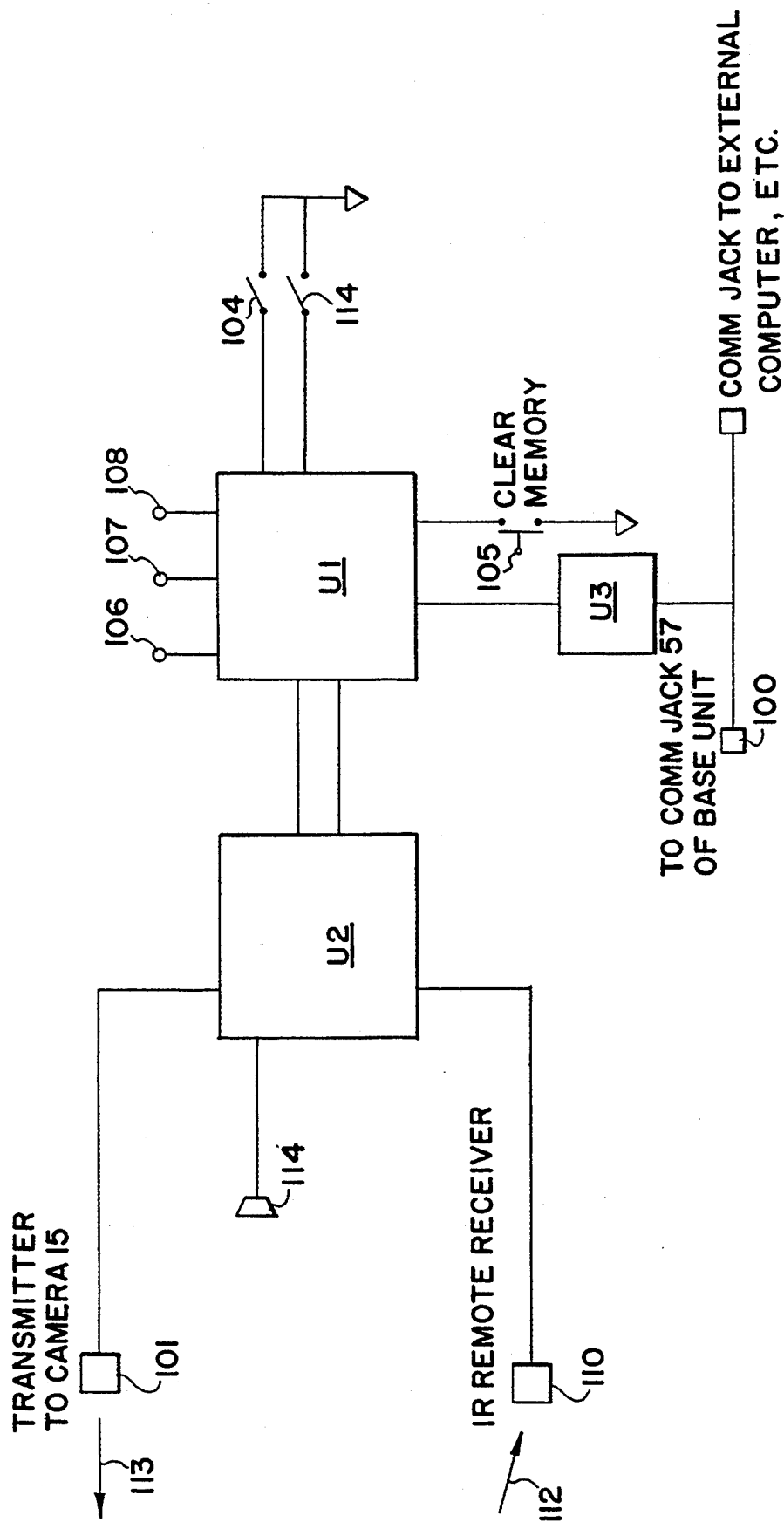

REMOTE CONTROLLED TRACKING SYSTEM FOR TRACKING A REMOTE-CONTROL UNIT AND POSITIONING AND OPERATING A CAMERA AND METHOD

CROSS REFERENCE TO RELATED APPLICATION

This is a continuation of application Ser. No. 07/875,078 filed on Apr. 28, 1992, now abandoned, which is a continuation-in-part of application Ser. No. 07/530,999, filed May 31, 1990, now U.S. Pat. No. 5,268,734, entitled "REMOTE TRACKING SYSTEM FOR MOVING PICTURE CAMERA AND METHOD"; and "REMOTE CONTROLLED TRACKING SYSTEM FOR TRACKING A REMOTE CONTROL UNIT AND POSITIONING AND OPERATING A CAMERA AND METHOD", Ser. No. 07/736,729, filed Jul. 26, 1991, now abandoned, and is related to Ser. No. 07/569,643, filed Aug. 20, 1990, now U.S. Pat. No. 5,179,421, entitled "TRACKING SYSTEM FOR MOVING PICTURE CAMERAS AND METHOD".

NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention relates to improvements in tracking systems that track a remote control unit and control the field of view of cameras to automatically follow moving targets and particularly to systems that allow remote control of such tracking cameras.

2. Prior Art

Apparatus for automatic tracking of cameras is known to the prior art and includes the system discussed in the above-referenced application.

While the remote tracking system represented a major advance in the art, improvements and refinements to the prior system are desirable, however, and should include improved tracking response and motor control programs for the PAN and TILT motors. The system should also include improved and additional remote unit commands and apparatus to allow for direct operation of the camera controls and improved instrumentation for monitoring and using the system features. A universal learning remote to allow the remote control unit to double for an infrared controller is also most desirable to provide for consolidation of remote controls in a single device.

SUMMARY OF THE INVENTION

In one aspect of the present invention there is provided a method of controlling the position of the field of view of a camera used to automatically track a subject with the field of view comprising the steps of: controlling the field of view of a camera, automatically tracking a subject with the field of view, selecting field of view positions of the camera, remembering the positions selected, and controlling the cessation of automatic tracking to return to a selected first position.

Other aspects include the steps of: selecting a first field of view of the camera by controlling the position of the field of view of the camera to automatically track the subject with the field of view of the camera to the selected position; re-enabling the automatic tracking disabled to begin automatic tracking of the subject by the field of view of the camera; and controlling the movement of the position of the field of view of the camera to move from a first position remembered to a second position by controlling the movement of the field of view to automatically track the subject to the second selected position and remembering the second position. Further steps include controlling the position of the field of view of a camera to move from a first position to another remembered position; adjusting the rate at which the position of the field of view is moved between a first position and another specific and remembered field of view; and controlling the perspective of the field of view to provide a selected perspective, adjusting the perspective of the field of view for a selected perspective of the field of view, and remembering a first selected perspective of the field of view. The invention also includes the steps of remembering the first perspective of the field of view at the remembered first position; automatically recalling the first perspective when the field of view returns to the first position; remembering a perspective associated with each position remembered; automatically recalling the perspective associated with the position when the position is recalled; controlling the cessation of automatic tracking of the subject by the field of view and providing a direction of movement command to move the field of view in a direction as determined by the direction of movement command so as to control the field of view for the purpose of determining a first position; and issuing a speed command to adjust the rate at which the return to the first selected and remembered field of view occurs.

Additional aspects of the invention include controlling the cessation of automatic tracking of the subject by the field of view, providing a direction of movement command to move the field of view in a direction as determined by the direction of movement command; providing a direction of movement command to move the field of view in a direction as determined by the direction of movement command; providing a Speed Control command to move the field of view at a specific rate; increasing or decreasing the rate of movement; and providing a command to begin control of the field of view to automatically track the subject with the field of view of the camera. Other steps include determining when automatic tracking of the subject is no longer possible, continuing to move the field of view of the camera in the same direction and at the same speed as the field of view was moving before automatic tracking of the subject was not possible; and determining when automatic tracking of the subject is possible to resume automatic tracking of the subject by the field of view of the camera. Commands can be used in several steps to control the field of view by issuing commands from a location remote from the camera to control the field of view of the camera to cause the cessation of automatic tracking of the subject and to cause automatic tracking to resume after automatic tracking has been commanded to cease, and controlling the field of view to provide a selected perspective, and issuing commands to alter the perspective; remembering at least one selected perspective of the field of view, and recalling the selected perspective; selectively remembering a first field of view of the camera, selectively remembering a second field of view of the camera, controlling the automatic tracking to cease automatic tracking and to return to the first field of view, and controlling the field of view to automatically return to the second field of view after a predetermined time period. These steps include the further steps of controlling the field of view such that when the field of view has returned to the second field of view the field of view is controlled to automatically return to the first field of view after a predetermined period, controlling the field of view to automatically return to the second field of view after a predetermined time period, and controlling the field of view to cycle between the first and the second field of views after waiting a predetermined time period at each selected and remembered field of view; controlling the field of view to automatically track a subject to the first field of view remembered; controlling the field of view to automatically track a subject to the second field of view of the camera; selecting the first field of view by ceasing the automatic tracking of the subject by the field of view with a direction of movement command to move the field of view in a direction as determined by the direction of movement command so as to control the field of view for the purpose of selecting the first field; selecting the second field of view by ceasing the automatic tracking of the subject by the field of view by providing a direction of movement command to move the field of view in a direction as determined by the direction of movement command so as to control the field of view for the purpose of determining the second field of view; issuing a speed command to adjust the rate at which the return to the first and/or second selected and remembered field of view occurs. Cycle commands can be issued to accomplish several of the steps.

Time periods, according to the invention are controlled by issuing a Time Period command which adjusts the predetermined time period to be a longer or shorter time period. Additional fields of view of the camera to be remembered can be selected and the camera controlled to continuously cycle between each remembered field of view after waiting a predetermined time period at each field of view. The additional fields of view of the camera can be selected by controlling the field of view to automatically track a subject to the remembered additional fields of view and by controlling the cessation of automatic tracking of the subject by the field of view by providing a direction of movement command to move the field of view in a direction as determined by the direction of movement command so as to control the field of view for the purpose of selecting the additional specific fields of view. A speed command to adjust the rate at which the return to the additional selected and remembered fields of view of the camera occurs can be issued.

A stealth function, according to the invention includes issuing a first command to discontinue automatic tracking of the subject by the field of view and to move the field of view in the same direction and at generally the same rate of movement existing at the time the command was issued; discontinuing the first command to resume controlling the field of view to automatically track the subject with the field of view; and discontinuing movement of the field of view if tracking of the subject is not possible.

Other steps in accord with the present invention include controlling the field of view from a first state of not being in motion to a second state having the desired speed for automatic tracking by controlling the field of view through a predetermined increase in the rate of movement of the field of view to accomplish the desired automatic tracking rate of the field of view of the camera; issuing a command to control the field of view of the camera to move in at least one plane, continuing to move the field of view until the subject becomes trackable, and automatically tracking the subject with the field of view of the camera. Additional steps include moving the field of view of the camera by the issuance of a direction of movement command; commencing the automatic tracking only after the subject is within a predetermined area within the field of view; controlling the predetermined increase in rate of movement to provide a gradual increase of the rate of movement of the field of view when the field of view is not initially in motion because the controlling of the field of view was not in the automatic tracking mode; and controlling the rate of movement such that after a time period if the field of view control has not eliminated the error between the subject being tracked and the desired location of the subject within the field of view the gradual increase of the rate of movement is discontinued and the field of view can automatically track at a predetermined normal rate. Speed is controlled by the steps of controlling the field of view to automatically track the subject by eliminating the error between an actual and a desired location of a subject; automatically selecting a tracking response rate of movement to eliminate the error based upon the magnitude of the error; and automatically adjusting the rate of movement at which the field of view is controlled in the tracking of the subject to be faster the greater the error and slower the lesser the error. The tracking also includes references to where the subject is and includes the steps of controlling the automatic tracking by determining the actual location of the subject relative to the field of view and determining the desired location of the subject relative to the field of view; establishing at least two tracking zones with each zone consisting of a corresponding area relative to the desired location of the subject wherein the tracking zones are different in area relative to the desired location of the subject; establishing for each tracking zone a tracking rate which establishes the rate at which the field of view of the camera moves to correct for the error between the subject's actual location and desired location; determining in which tracking zone the subject is located; and controlling the field of view to automatically track the subject at a rate determined. This also includes establishing a first tracking zone and a second tracking zone wherein the first tracking zone consists of an area defined by a distance from a reference representing the desired location of the subject relative to the field of view and which represents less error than the second tracking zone which consists of a larger area defined by a greater distance from the same reference than the first tracking zone; determining when the subject being automatically tracked by the field of view is located within the first or second tracking zone; and controlling the field of view such that when the subject is located within the first tracking zone the rate at which the field of view is controlled to eliminate the error is slower than when the subject is located within the second specific tracking zone. Further steps of this method include (1) selectively maintaining the rate of tracking for a subject in the second zone when the subject moves into the first zone from the second zone during error elimination, and automatically reselecting the rate of tracking of the first tracking zone when the error has been substantially eliminated; (2) establishing one of the tracking zones to be the smallest tracking zone and which represents the zone with the smallest area defined relative to a reference representing the desired location of the subject, and tracking the subject in the field of view when it is located within the smallest tracking zone such that there is no movement of the field of view until the subject moves out of the smallest tracking zone; (3) establishing additional tracking zones each representing a larger error around the desired location of the subject relative to the field of view such that the larger the error that each additional adjacent tracking zone represents that the faster the rate of tracking will occur when the subject being automatically tracked by the field of view control moves into an additional adjacent tracking zone; and (4) establishing that the fastest rate of tracking selected will be the rate which is maintained until the error between the actual location of the subject relative to the field of view and the desired location has been substantially eliminated. Other steps involving the use of zones include controlling the field of view to automatically track a subject with the field of view in at least one plane; selecting a desired location of the subject relative to the field of view in one plane; defining the actual location of the subject in one plane relative to one side of the desired location of the subject to be a first error zone and the actual location being located one opposite side of the desired location to be a second error zone; controlling the field of view such that when the subject moves from being located at one error zone to another error zone and then again to the one error zone within a predetermined time period the field of view will not be moved; and controlling the field of view such that while the subject continues to move within the field of view from one error zone to another error zone within a predetermined time period the field of view will not be moved. These steps can also be accomplished in two planes.

BRIEF DESCRIPTION OF THE DRAWINGS

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings, in which:

FIG. 6 is a pictorial diagram representing the field of view of the camera with respect to the subject and the remote unit in accord with the present invention;

FIG. 7 is a pictorial diagram of the field of view of FIG. 6;

FIG. 8 is a pictorial diagram of the tracking response windows used in the present invention;

FIG. 9 is a pictorial diagram of the universal learning remote control unit of the present invention;

FIG. 10 is a simplified block diagram of the remote unit of FIG. 9; and

DETAILED DESCRIPTION OF THE PREFERRED EMBODIMENT

The present invention is a remote tracking system and method particularly for applications which require remote control of the field of view of a moving picture camera such as video camcorders and still cameras. A brief review of the design and operation of the prior applications Ser. Nos. 07/530,999 and 07/736,729 will be helpful in explaining the improvements described herein.

The base unit of the tracking system transmits an infrared signal through a rotating set of lenses or signal shapers designed to structure the IR beam in a predetermined process. The base unit includes a microprocessor which monitors indicating circuitry to calculate the error from exact alignment between the base unit and the remote unit wherein exact alignment is 0 degrees. The remote unit transmits an RF signal to the base unit containing information regarding the received IR signal, particularly the instantaneous strength of the signal. The base unit contains computational circuitry to calculate the location of the IR beam at the time of reception, a predetermined level of signal strength of the IR signal, which preferably is a "peak", by the remote unit with respect to a reference established by the base unit circuitry.

The remote unit is preferably in the form of a hand-held wand or rod elongate in shape that includes audio circuitry and the capability of utilizing either internally mounted IR sensors or a separate device that includes the IR sensors. The remote unit can transmit "Peak" or other IR signal data to the base unit as well as "Commands".

The system also employs electronic means to operate the camera controls which includes an infrared communications link that can be interfaced to the base unit control circuitry to operate the controls of the camera.

Other features include an improved PAN and TILT position indicator employing an optical disk that rotates through an optical detection system to monitor actual position without a mechanical potentiometer that can become erratic with age and wears even when not being used. The preferred embodiment of the present invention employs an optical disk position indicator that provides an absolute position output signal rather than relative movement. This is accomplished by employing an encoded light blocking array pattern on the disk which then provides an output to computational circuitry for use in system operation.

The electronics of the base unit and remote unit is substantially identical in all respects to that illustrated in Ser. Nos. 07/530,999 and 07/736,729.

Figure 1:
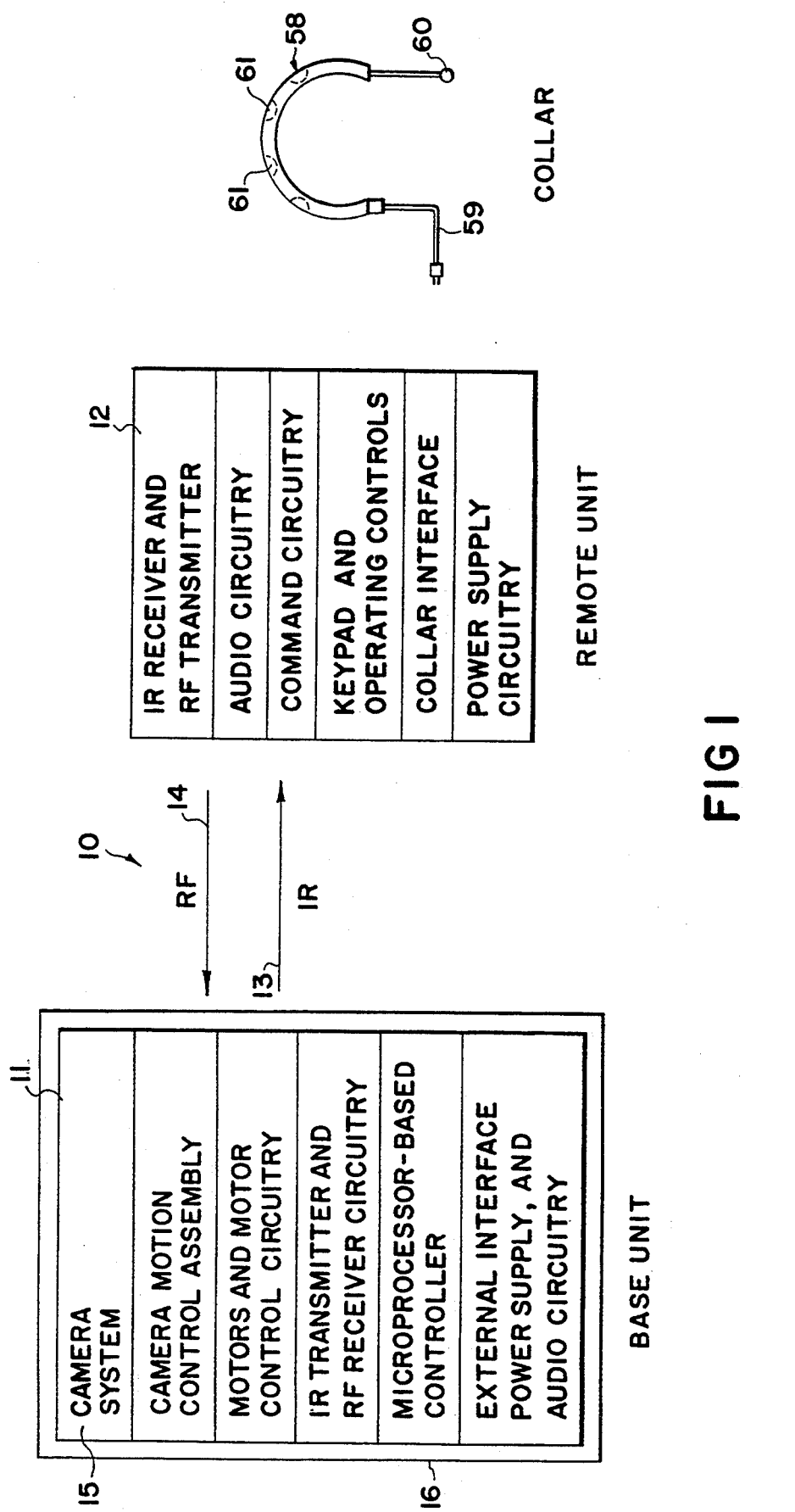
FIG. 1 is a simplified block diagram of the base unit and remote unit apparatus of the tracking system in accord with the present invention.
Figure 2:
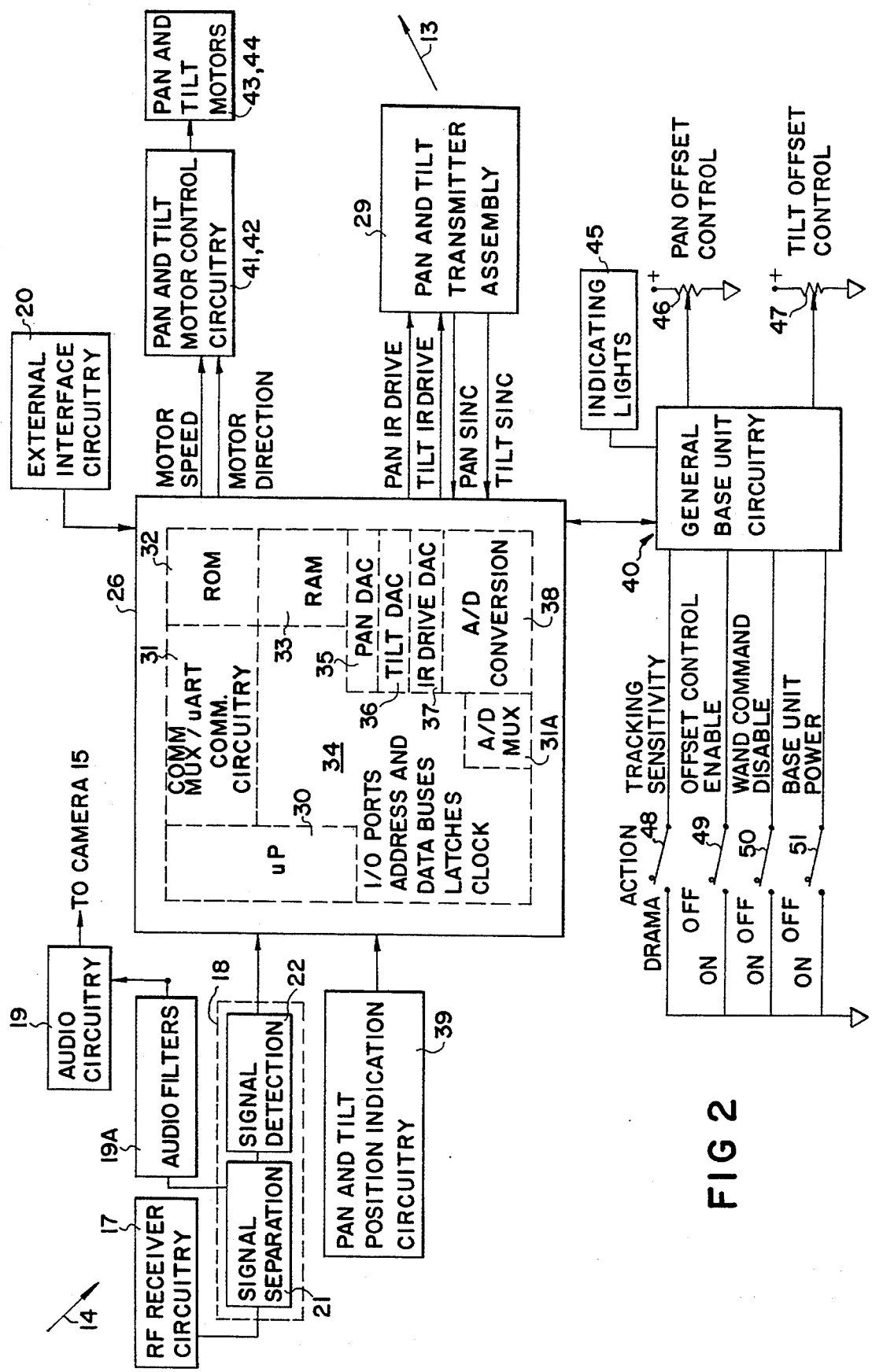
FIG. 2 is a detailed block diagram of the base unit of FIG. 1.

With reference now to the drawings, simplified block diagrams of the field of view control system are illustrated generally at 10 in FIGS. 1-2. Base unit 11 tracks a remote unit 12 which is preferably constructed as a hand-held wand and which includes a microphone and associated FM audio circuitry as will be explained in greater detail hereinbelow. The base unit 11 transmits an infrared (IR) signal 13 which is detected by the remote 12 which in turn transmits to the base 11 an RF signal 14 containing data as will be discussed. The base unit 11 includes a camera system 15 and other circuitry and systems contained in a housing 16. The base 11 is mounted on a tripod or table top.

FIG. 2 is a block diagram of the base unit 11. RF space diversity receiver 17 receives a signal 14 and provides an output to audio circuitry 19 and command-/IR signal strength circuitry 18. Audio output from audio circuitry 19 is sent to the camera 15 sound system. Command and IR Peak signal data that is filtered and separated via separation circuit 21 is provided to IR Peak and Command circuitry 22 that sorts out "Peak" signals from "Command" signals transmitted by remote 12 which are then sent to microcomputer controller 26 which can also receive data from a standard external communication circuit interface 20. Audio is separated and sent via filter 19 A to audio circuitry 19.

TILT and PAN IR signals 13 are transmitted through their respective windows 23′ and 24′ which have zero reference planes 27, 28 respectively aligned with the horizontal and vertical center lines of the camera field of view 25. Adjustments that will be described are used to align the field of view 25 of a particular camera 15 with the reference lines 27, 28. The PAN and TILT transmitter assembly 29 represents the respective circuitry for IR transmission.

Controller 26 is a microcomputer built around a microprocessor 30, communication circuit 31, with ROM 32, RAM 33, associated standard circuitry 34 and three digital-to-analog (DAC) devices 35, 36, 37. Controller 26 has inputs from PAN and TILT position indication circuits 38, 39 and peripheral circuits 40. Output signals include those supplied to PAN and TILT motor 43, 44 via the respective motor control circuits 41, 42.

A/D Multiplexer (MUX) 31A is a conventional circuit and acts as an interface for PAN and TILT position data from indication circuits 38 and 39 respectively and receives data from the PAN OFFSET control and TILT OFFSET control potentiometers 46 and 47 respectively.

Microprocessor 30 also receives PAN and TILT sync pulses from the transmitter assembly 29 which includes indicating means responsive to the apparatus that rotates the signal shapers that cause scanning of the IR beam across a defined area. The sync pulses are directed to INTERRUPT gates on the microprocessor 30. Finally, auxiliary circuits 34 is the grouping of all of the usual support circuits that are needed in the operation of a standard 8-bit microprocessor 30 and auxiliary circuits 40 include all the input switches (FIG. 5), status lights 45 (FIG. 4) and interfaces that are related to the controller 26, as is understood in the art. Switch 48 controls two different tracking response or sensitivity modes; namely DRAMA and ACTION. Switch 49 controls the enabling of OFFSET CONTROL using the PAN and TILT OFFSET pots 46 and 47. Switch 50 controls the ability of base unit 11 to respond to COMMANDS from the wand 12. Switch 51 controls base unit power. Switches 48–51 will be described in more detail hereinbelow with reference to the operation of the system.

Figure 3:
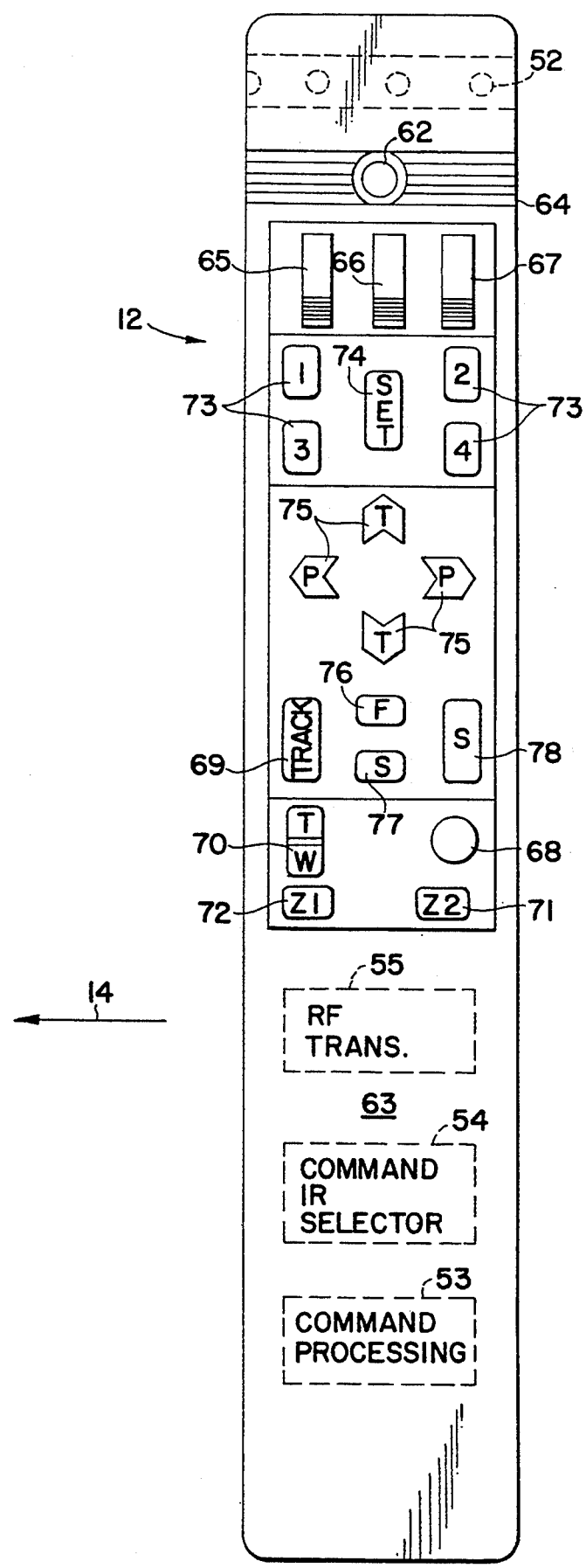
FIG. 3 is a front elevational view of the preferred embodiment of the remote unit in accord with the present invention.

FIG. 3 illustrates the wand as the preferred embodiment of the remote unit 12. A series of IR sensors 52 detect the signal 13 which is directed to command processing and command/peak selector circuits 53 and 54. Wand 12 also includes the RF transmitter circuitry 55 for providing the RF signal 14 which includes information preferably in the form of "Peak Detection" data regarding IR signal strength as well as commands initiated via the various keys.

Collar 58 is an alternate remote sensor unit and includes a jack 59 by which it can plug into the peak detection output circuitry of wand 12. It includes an array of IR sensors 61 and an audio microphone 60.

Preferably., the wand 12 also includes its own built-in mic and associated circuitry 62 that is physically positioned in a manner to encourage the correct orientation of wand 12 and its IR sensors 52 during use. This physical orientation is also used in the preferred embodiment of the collar 58.

The command keypad includes a plurality of keys for an expanded group of command functions. (1) START/STOP button 68 is used for the camera ON/OFF function. (2) AUTO TRACK button 69 is used to set automatic tracking ON/OFF. (3) WAND POWER is controlled on/off by button 65. (4) MIC POWER is controlled by button 66. (5) FILTER button 67 is used for IR gain control. (6) Zoom rocker switch 70 is used to control ZOOM WIDE and ZOOM TIGHT for the camera 15 ZOOM lens. (7) Z1 and Z2 buttons 71, 72 are used for two ZOOM presets. (8) LOCATION PRESET buttons 73 are used to set four locations of PRESET via set switch 74. Four LOCATION PRESET buttons 73 are used to set four locations into memory by using PAN/TILT OVERRIDE buttons 75 to move to a particular field of view of camera 15 or by simply tracking to a particular field of view. A button 73 is pressed and then the pressing of SET button 74 will result in the remembering of the selected field of view. The data from position indicator circuitry 38, 39 at the selected presets is then stored into the memory of controller 26 and can be recalled by depressing the appropriate button 73. The recall to a preset location will automatically override the tracking function and position the base unit 11 according to the stored data. The camera 15 can then be operated as desired. (9) The PAN/TILT OVERRIDE buttons 75 provide Direction of Movement commands which are used for manual control of respective functions in conjunction with FAST and SLOW speed control switches 76, 77. (10) The STEALTH ON/OFF button 78 is used with a STEALTH function for cases when a user will walk behind a barrier that will break IR communication between remote 12 and base unit 11. As explained previously, the RF return signal 14 includes data regarding the IR signal strength in the form of "Peaks" for the received PAN and TILT signals 13. When STEALTH button 78 is operated "on" and held depressed, a COMMAND signal is sent to base unit 11 which, via stored software in ROM 32, will provide that the base unit 11 will continue moving at the same rate and in the same direction. Circuit data on movement direction and speed is stored in the memory circuits of controller 26. Stealth modes will be discussed in more detail hereinbelow.

SYSTEM OPERATION

Figure 4:
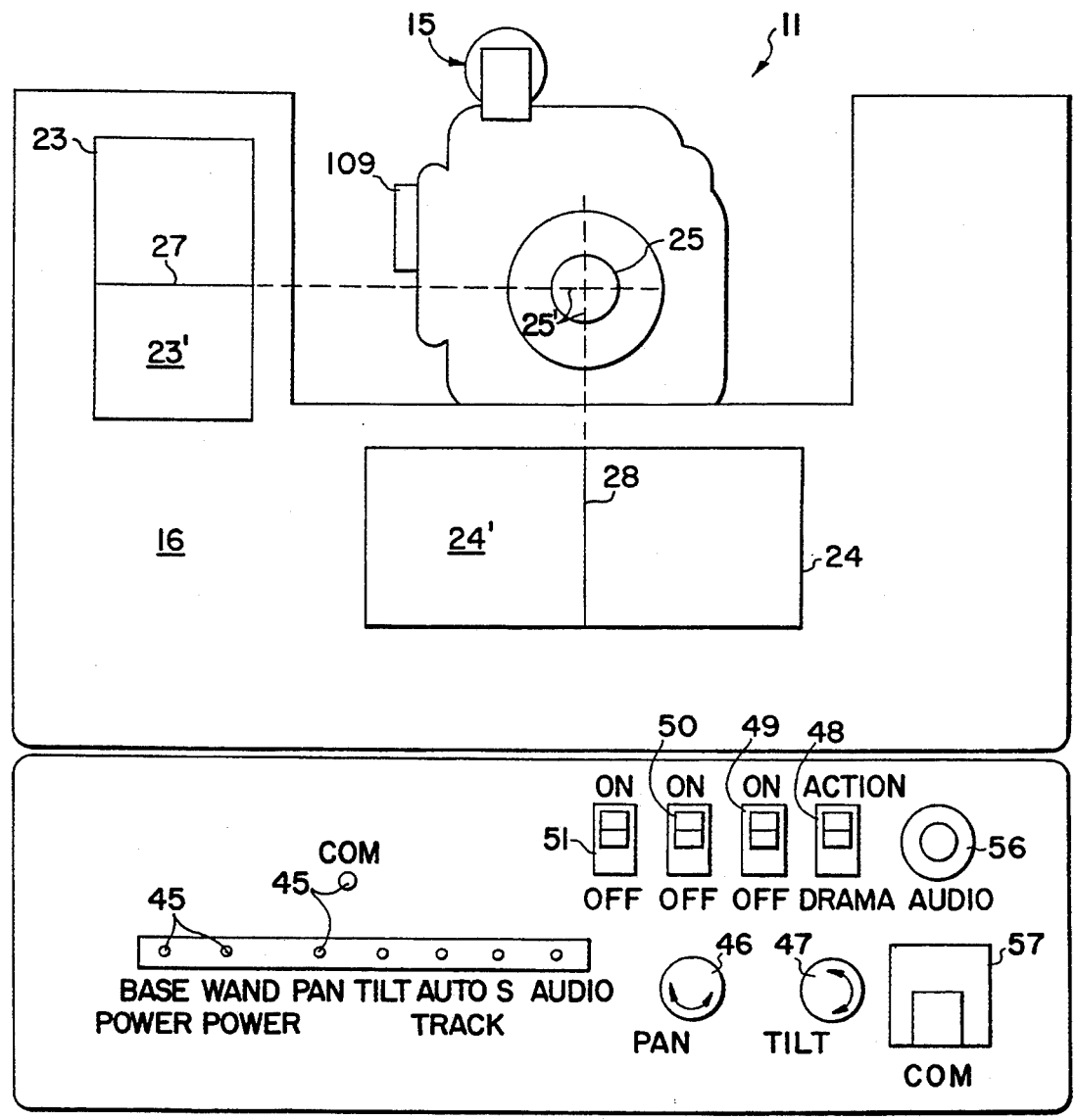
FIG. 4 is a pictorial illustration of the base unit in accord with the present invention having a video camera mounted thereon.

Software for the operation of the system is placed in ROM 32 and includes programs for response of the base unit 11 to commands from the wand 12 and the complete autotracking functions of the system including location presets and the operation of all controls associated with the camera 15. With reference to FIG. 4, the various operations of the system can be illustrated.

The TILT scanner 23 contained in the transmitter assembly 29 has a window 23' that covers it. The TILT scanner 23 has a zero reference plane 27 which is illustrated as being aligned with the horizontal centerline 25' of the field of view 25 of the camera 15 for maximum accuracy. PAN scanner 24 is covered by window 24' and also has a zero reference plane 28 aligned with the vertical field of view centerline 25'. FIG. 3 illustrates a camera 15 that is aligned with the zero reference planes 27 and 28. PAN and TILT offset control pots 46 and 47 are used to electronically adjust, via the controller 26, the PAN and TILT zero references, via Desired Location Adjust commands, to be in alignment with the camera field of view 25. (The offsets 46, 47 can also be used to establish other Desired Locations and reference arrangements as desired.) Also, via the software of ROM 32, the error on one side of a zero reference line 27, 28 will be designated "positive" and the error or displacement from the reference to the other side will be designated "negative".

The automatic tracking of the wand 12 by the base unit 11 is controlled via the AUTOTRACK switch 69. Location presets are controlled by set switch 74 to enter data from PAN and TILT position indicating circuitry 39 into RAM 33. The recalling of a preset location while in autotracking mode will override automatic tracking which can then be restarted if desired by way of switch 69.

In the present invention, software in ROM 32 includes functions for a CYCLE mode whereby the base unit 11 will automatically move from the first location preset to the others (that have been remembered) and then repeat this action during the CYCLE mode, the base unit 11 will be positioned at each preset point for an adjustable hold time. In addition, the speed at which the base unit 11 moves from one preset to another is adjustable by Speed commands in ten steps with 10 being the fastest and 1 being the slowest. Speed is adjusted by depressing SET switch 74 and then depressing SLOW switch 77 (to decrease speed) or FAST switch 76 (to increase speed). With both switches held down, the simultaneous release of both switches will change the speed by one increment as desired.

The CYCLE mode is initiated by depressing and holding down the START/STOP switch 68 and SET switch 74. Once in the CYCLE mode depressing and releasing both the switches 68 and 74 will result in the transmission of a CEASE CYCLE MODE command.

The hold time in the cycle mode is adjustable from 0 to 255 in intervals of 1 second. The Hold time for the CYCLE mode is adjustable only when in the CYCLE mode and is accomplished by Time Period commands generated by depressing either FAST switch 76 or SLOW switch 77 to shorten or lengthen the hold time.

The speed of movement of the base unit 11 during movement in the CYCLE mode is adjustable via Speed commands by the simultaneous operation of either FAST or SLOW switches 76, 77 and SET switch 74 in increments of 1 in a range of 255 increments with the higher number representative of a faster speed.

In the present invention the ROM software includes a PID control algorithm which gradually increases the speed of the PAN and TILT motors 43, 44 to maximum when the location preset speed has been set to maximum and gradually decreases the speed as the base unit approaches the preset position. The purpose of this feature is to provide for movement between presets without overshoot to be accomplished in the shortest possible time. The "ramps" up and down are possible because the controller 26 has information regarding the present PAN and TILT position and has the desired position in memory. Accordingly, the speed of motors 43, 44 can be changed in response to the calculated error signals derived by controller 26. When established, the motor speeds are used when (1) moving to a location preset from tracking; (2) moving from one location preset to another; and (3) moving between presets in the cycle mode. In the present invention, only a single set of hold times and speeds are provided for all possible PRESETS. It is to be understood that it would be obvious to anyone skilled in the art to provide that the speeds and hold times between individual presets could be variable independently.

AUTOTRACKING RESPONSE

The present invention determines the error that exists between the actual position of the PAN and TILT reference planes 27 and 28 of the base un° it 11 from PAN and TILT position circuitry 39 and the relative position of wand 12 with respect to the same reference planes 27 and 28. This error can be calculated in terms of degrees of angular deviation between the two positions or it can be expressed in more abstract terms, such as clock counts, if desired motor speed can then be determined and the base unit 11 moved to eliminate the error.

The present invention includes refinements to the tracking response that are stored in ROM 32. The tracking response adjustment is the rate at which the base unit 11 is moved to eliminate the error between the unit 11 and the wand 12 and it is adjustable via commands from the wand 12.

ACTION/DRAMA switch 48 provides for two different tracking response command techniques. First, in the ACTION position, the base unit controller 26 will be moved to eliminate the position error as it occurs as discussed above. Second, in the DRAMA position two different options are available. In the first option, the software in ROM 32 establishes a number of "windows" within the tracking area. The windows vary in size (as measured in degrees or amount of error from the reference planes 27 and 28) with a larger window containing a smaller one. Because the smaller window represents points that are within a smaller value of error, a slower tracking response may be selected. Several additional refinements may be selected. For example, as the error gets larger which occurs when the subject moves out of a smaller window, the tracking response gets faster. However, as movement of the base unit 11 reduces the error, the response will remain at the response for the largest window in which the subject was present until the base unit 11 movement has substantially eliminated the error. In the second option, the smallest window can be selected to represent no autotracking and accordingly, the base unit 11 will move only when the subject moves into a larger window and then move base unit 11 to substantially eliminate the error. In the preferred embodiment of the present invention software flowcharts are provided for the following windows options. First, window 1 is defined as +/−10 degrees on either side of each reference plane 27 and 28 and window 2 is defined as errors that are greater than (i.e., outside) window 1. Second, a three window arrangement is defined with window 1 as before, window 2 as +/−15 degrees and window 3 as +/−20 degrees. It is to be understood that additional windows could be established as desired. The windows themselves are established by the software and are not selectable by the user. The factory setting for the ACTION mode is a value of 8 on a scale of 1 to 12 wherein the higher number represents a more sensitive or less-error tolerated setting. The factory setting for DRAMA mode is 3 on a scale of 1 to 12. The user can adjust the ACTION tracking as follows. First, ACTION/DRAMA switch is placed in the ACTION position. Then, the TRACK switch 69 is depressed followed by operation of the FAST or SLOW switch 76 or 77 as desired. Simultaneous release of the switches 69 and 76/77 will result in a 1 increment change in response. Incrementing the tracking response causes greater gain multiplication in the PID algorithm; decrementing is the opposite. The user does not have the ability to adjust the response in the DRAMA mode.

The present invention also includes software for an AUTOFIND function in order to locate the wand 12. To actuate AUTOFIND, the TRACK switch 69 is depressed and held down. Then a PAN or TILT arrow switch 75 is depressed. When both switches 69 and 75 are released base unit 11 will pan or tilt in the direction indicated until the wand 12 is in the field of view of base unit 11 at which time the AUTOTRACKING function will resume. AUTOFIND can be terminated during a search by pressing TRACK switch 69. AUTOFIND is also terminated if base unit 11 is not located in either 380 degrees of movement or a predetermined time period (40 seconds) whichever occurs first.

PAN and TILT OVERRIDE switches 75 are used to override the automatic tracking mode. These functions do not require the wand 12 to be within the base unit field of view. The speed of movement of the base unit 11 is adjustable in a range of 1 (slowest) to 50 (fastest) by operating switches 76 or 77 to increment or decrement the speed of movement. Switches 75 automatically disable autotracking. The automatic tracking is reestablished by depressing TRACK button 69.

ZOOM PRESET switches 71 and 72 are used with SET switch 74 to store in memory two ZOOM perspectives. These zoom presets are independent of the location presets discussed previously. The stored zoom is recalled by depressing the switch 71 or 72.

Figure 5:
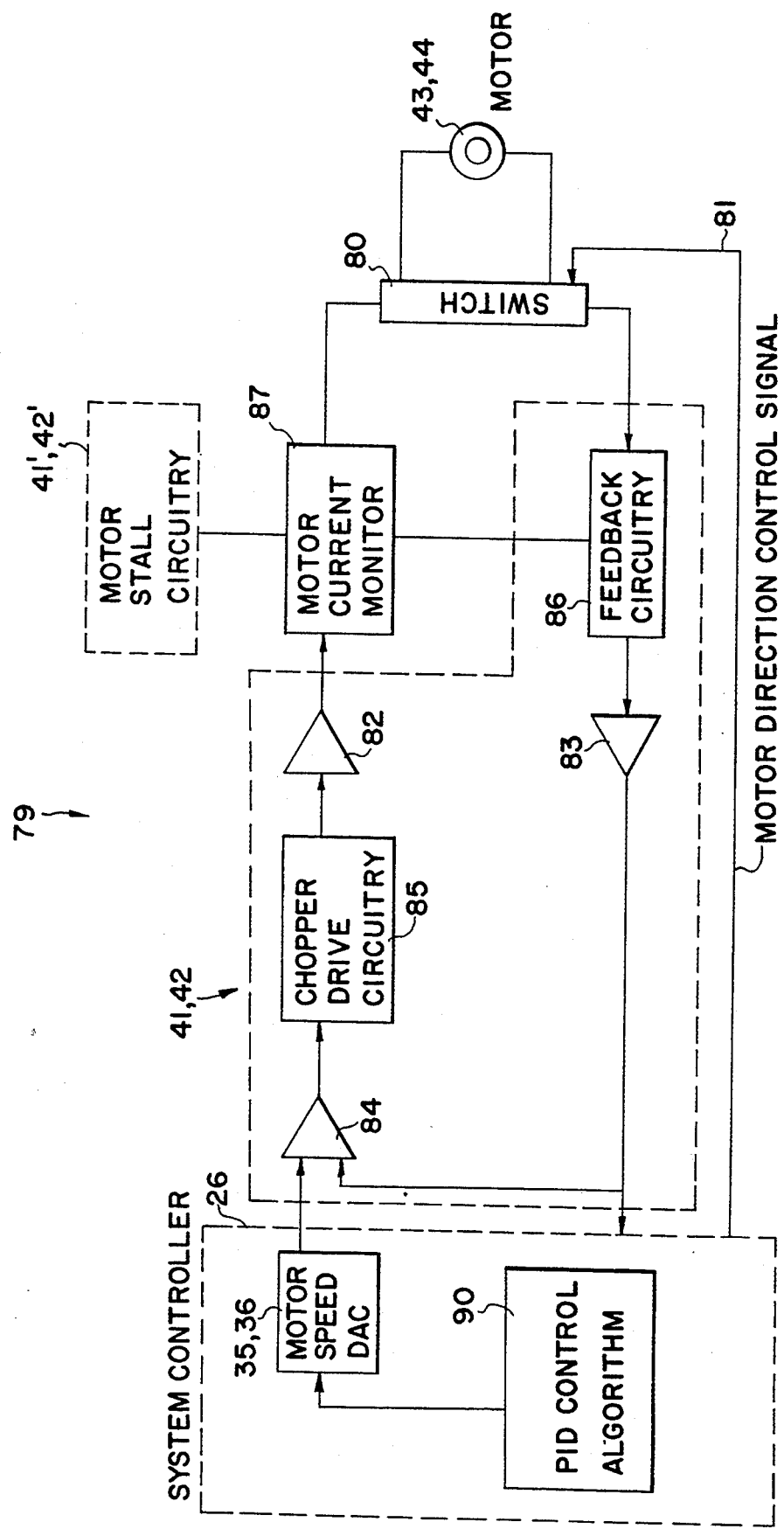
FIG. 5 is a block diagram of the PAN and TILT motor control circuitry.

FIG. 5 illustrates the motor control circuitry 41, 42 and software in a diagrammatic form. The motion control assembly electronics 79 includes a motor direction control switch 80 which is operated by a motor direction control signal on line 81. The system electronics further includes amplifiers 82, 83 and 84; chopper drive circuitry 85; and feedback circuitry 86 to provide a control loop that provides power to motors 43, 44. Motor speed data is provided from PAN DAC and TILT DAC 35, 36. The system also includes current monitor 87 to measure the motor back EMF which can supply an output to optional motor stall circuitry 41', 42'.

The ultimate control of the motors 43, 44 rests with PID control loop algorithm 90 stored in controller ROM 32. As understood in the art "P" is a variable equal to a proportional control error subtracted from the previous error with this new error multiplied by a "gain" variable. "I" is equal to a integral control calculation which is determined by the current error value multiplied by a second "gain" variable. "D" is equal to a derivative control calculation which consists of the output of the current proportional term subtracted from the previous calculation and multiplied against a third "gain" variable. P, I, and D, are added together and constitute an output control signal that is scaled by the controller 26 for the specific hardware employed in the application. The PID gains are adjustable when the user selects different tracking responses as will be described hereinbelow.

The specific tracking response is controlled via software placed in ROM 32 which adjusts the gain variables as appropriate to a particular application. The "ramping" up and down to accomplish different motor speed responses is also fixed in the software.

The gain changes that are incorporated in the software also include a ramping function such that the gains are changed gradually during a 1 second time period as will be discussed further hereinbelow. These refinements provide for smooth tracking with no overshoot at whatever operating speed has been selected either by the user or the manufacturer.

Software is also included in ROM 32 for the determination of whether tracking is possible in both the PAN and TILT directions. Preferably, autotracking is not enabled if the base unit 11 cannot simultaneously track in both the PAN and TILT functions due to a lack of tracking signals in either plane. Autotracking will be used when the tracking signals are present and the autotrack function has been selected.

The operation of the camera 15 record function is controlled directly via START/STOP switch 68.

FIG. 6, 7 and 8 illustrate the tracking response window arrangements in conjunction with a subject 91. As shown in FIG. 6, the wand 12 can be held below the camera field of view 25 by using TILT OFFSET pot 47 (FIG. 4) to electronically adjust the TILT zero reference 27 to the desired position. The image 92 within the field of view of the camera 15 includes the portion 93 of the subject 91 within the camera field of view 25. FIG. 8 illustrates a 3- window tracking response program with switch 48 in DRAMA in diagrammatic form. Large window 94 defines an area above and below and to either side of the zero reference planes 27 and 28 with two successively smaller windows 95 and 96 contained therein. Window 96 is designed so that movement of the wand 12 therein will not result in movement of the base unit 11 so that a person 91 who "talks with his hands" will not cause a jerky motion of the camera 15. In addition, programs in DRAMA mode provide for "crossover" control, that is movement back and forth from a zero error position into two "error zones", each defined by the respective zero reference planes 27 and 28. These programs provide for no base unit 11 movement during the automatic tracking mode if "crossover" or the "crossover and return" occurs within a predetermined time period which, preferably, is 1 second. This program also prevents unnecessary movement of the base unit 11 and provides a smoother picture recording.

With reference now to FIGS. 9 and 10, the camera controller (CAMCON) 97 includes a programmable universal CAMCON unit 98 that is designed to replace the conventional IR remote control unit 99 that is used with camera units having remote control. The CAMCON unit 98 includes a jack 100 that connects to the COM input 57 on base unit 11 for communications between the two and an IR transmitter 101 attached to a flexible cord 102 to which is attached a Velcro fastener 103. LEARN/RUN switch 104 is used to provide that the CAMCON unit 98 will "learn" commands which can be cleared by recessed MEMORY CLEAR switch 105. LED's 106, 107, 108 provide indication as will be described. Camera IR receiver window 109 (FIG. 4) receives IR signals from remote control 99 which is typical of many IR remotes used with camcorders as is understood by those skilled in the art. LEARN window 110 receives an IR signal from transmitter 86. Remote control unit 99 includes function keys 111 and emits an IR signal 112. Transmitter 101 emits IR signal 113 which is directed to IR receiver window 109 by positioning the cord 102 via Velcro attachment 103. The CAMCON unit 98 can learn commands for two different cameras "A" or "B" selectable via switch 114.

Operation and programming of the system is accomplished as follows. The first step is to place switch 104 in the "LEARN" position. LED 106 indicates "ready for wand commands" when it flashes on. For example, if the ZOOM rocker switch 70 (FIG. 3) is depressed to "wide" after a pause an audible beep will be provided from CAMCON unit 98, LED 106 will turn off and LED 107 will begin flashing indicating "ready for command". CAMCON unit 98 is now aimed at learn window 110 and the zoom wide key 111 is depressed and held until LED 107 goes off and LED 106 begins flashing. This sequence can be repeated for other standard commands such as ZOOM TIGHT and camera record STOP/START commands that exist with all remotes 99.

After programming, switch 104 is placed in the RUN position. Now, if ZOOM wide is operated via rocker 70 on wand 12 or by command from a remote computer (not shown), base unit 11 will provide a signal via jack 100 to CAMCON unit 98 which will translate the signal into the IR signal 113 which matches the ZOOM wide function of remote 99 (which is no longer used). Thus, camera 15 will receive, at window 109, the same signal it is designed to receive from remote unit 99. LED 108 indicates ERROR if there is something wrong with CAMCON unit 98. The CAMCON unit 98 provides for a computer communication feedthrough to the base unit 11 from remote sources.

CAMCON unit 98 can also "learn" up to four other "generic commands" that may be available as options with a particular remote 99. These commands may be options such as counter reset, fast forward and so forth.

The procedure for learning these other commands is as follows. Switch 104 is placed in "learn". LED 106 will begin flashing. Press the START/STOP switch 68 on wand 12 and then press the location preset button 73 #1. This command will be received as before. Now point remote 99 at learn window 110 and press the desired command such as "counter reset". If generic command 1 is now sent by depressing switches 68 and 73, the wand will transmit a command recognized by camera 15 as counter reset. This procedure can be repeated using presets labeled #2-4 for three additional commands.

FIG. 10 illustrates the electronics of CAMCON unit 98 in block diagram form. U1 is a conventional microcomputer and U2 is a universal IR remote learning IC that is well known in the art. U3 indicates the necessary circuitry to provide communication between U1 and base unit 11 via jacks 100 and 57. Buzzer 114 provides an audio beep for assistance with system operation.

Finally, when using CAMCON unit 98, the ZOOM position of the camera 15 is read and stored in the memory of the unit 98. Software for the system provides that the base unit 11 can query the CAMCON unit 98 for ZOOM position each time a location preset is selected. Accordingly, when using the CAMCON unit 98, a ZOOM position is automatically remembered with each location preset that is selected from wand 12 (or from a remote computer).

Referring now to the simplified flow charts of FIGS. 11–18, a more detailed description of the software of the present invention is presented.

DRAMA MODE TRACKING

1. Dual Window Method

Figure 11:
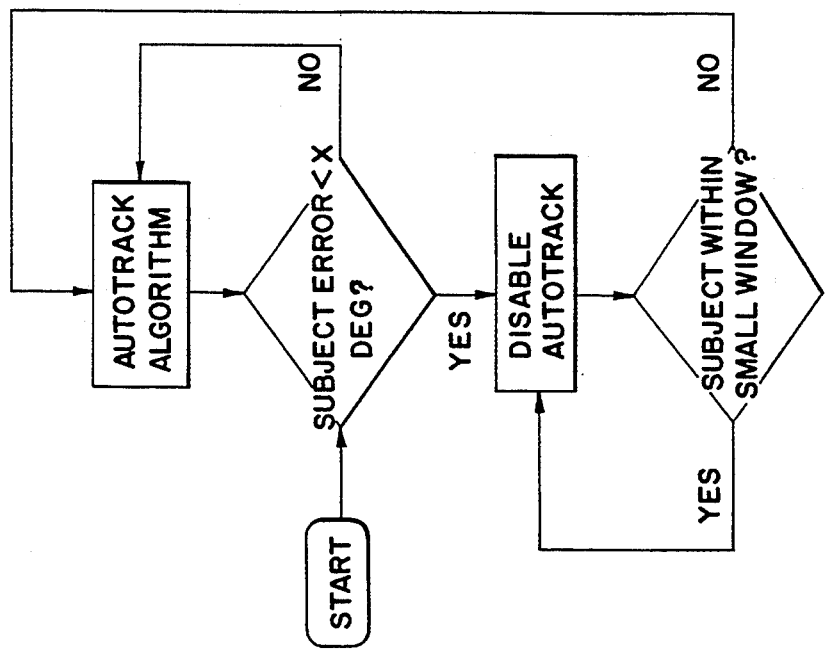

FIG. 11 illustrates a dual window method of tracking in the DRAMA mode. The autotrack algorithm is stored in ROM 32 and operates to track the wand 12 if the error between the established references and the location of the field of view of camera 15 exceeds a preset amount, which is preferably expressed in angular degrees. The FIG. 11 illustrates that automatic tracking is disabled if (1) the error is small or (2) the subject is within the small interior window. If the subject moves out of the smaller window into the larger window the autotracking function will again be enabled and tracking will reduce the error to a preset amount, preferably less than 1 degree.

Figure 12:
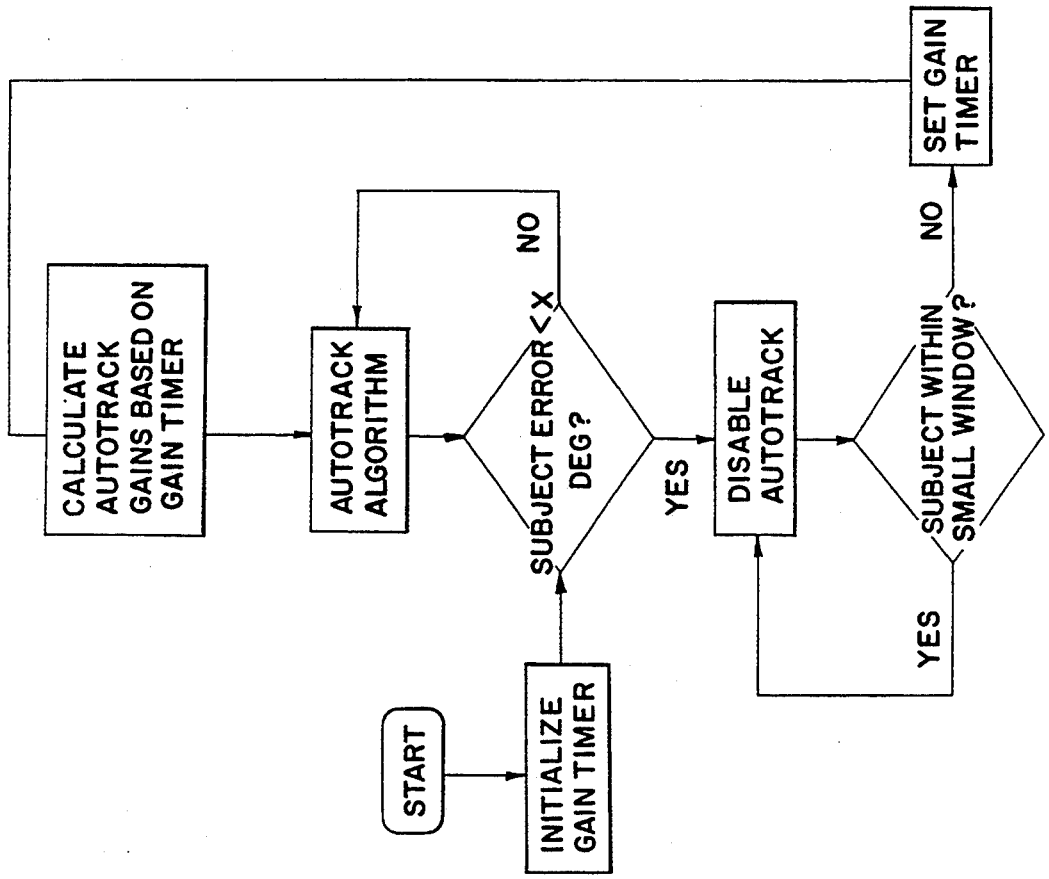
FIGS. 11-18 are simplified flow charts illustrating motor control programs.

FIG. 12 illustrates a dual window method utilizing a time-based ramp-up method of handling the transition between a stationary situation and the autotracking mode. The PID gains are increased with time to the final selected values. In both cases the tracking response is reset to its initial value after the error has been substantially eliminated.

2. Multi-Window Method

Figure 13:
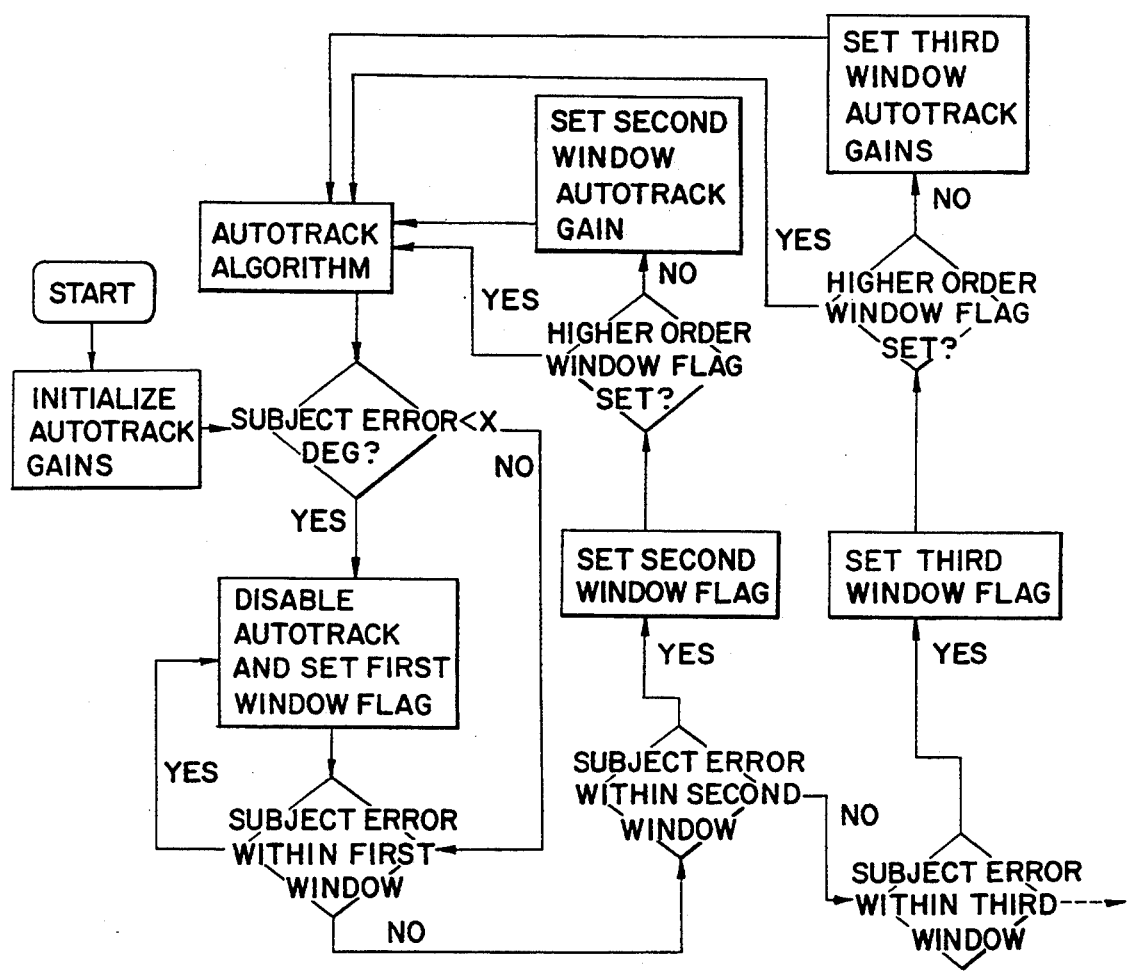

FIG. 13 illustrates the programming for greater tracking response (higher gains) as the subject moves into larger windows. This particular approach can be used with any desired number of windows. The greatest response selected is maintained until the error is substantially eliminated. This method also includes the disabling of automatic tracking when the subject is within the smallest window.

Figure 14:
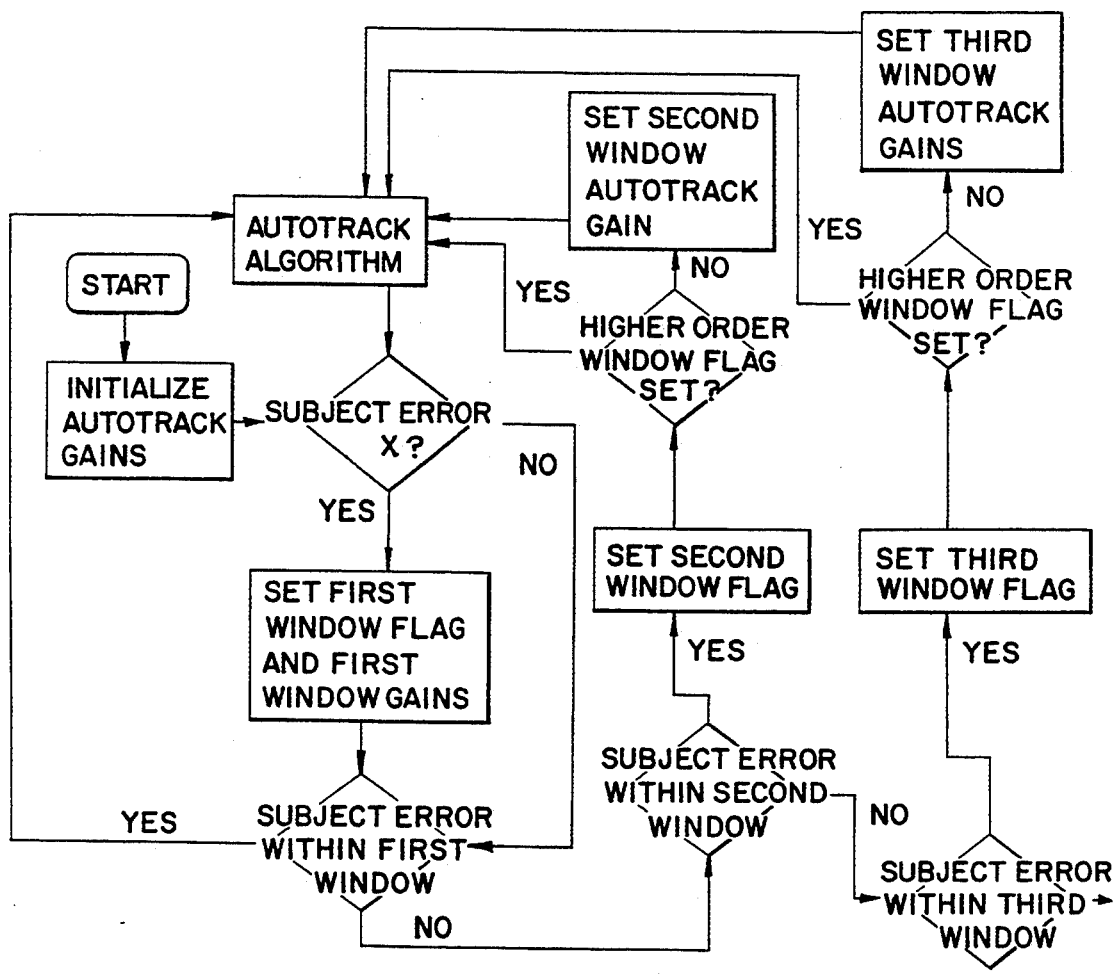

FIG. 14 illustrates a multi-window method as in FIG. 13 but when the subject is within the smallest window. Here also, the largest tracking response selected is maintained until the error is substantially eliminated. The tracking response is then reset to its initial value.

3. Error Ramp Method

Figure 15:
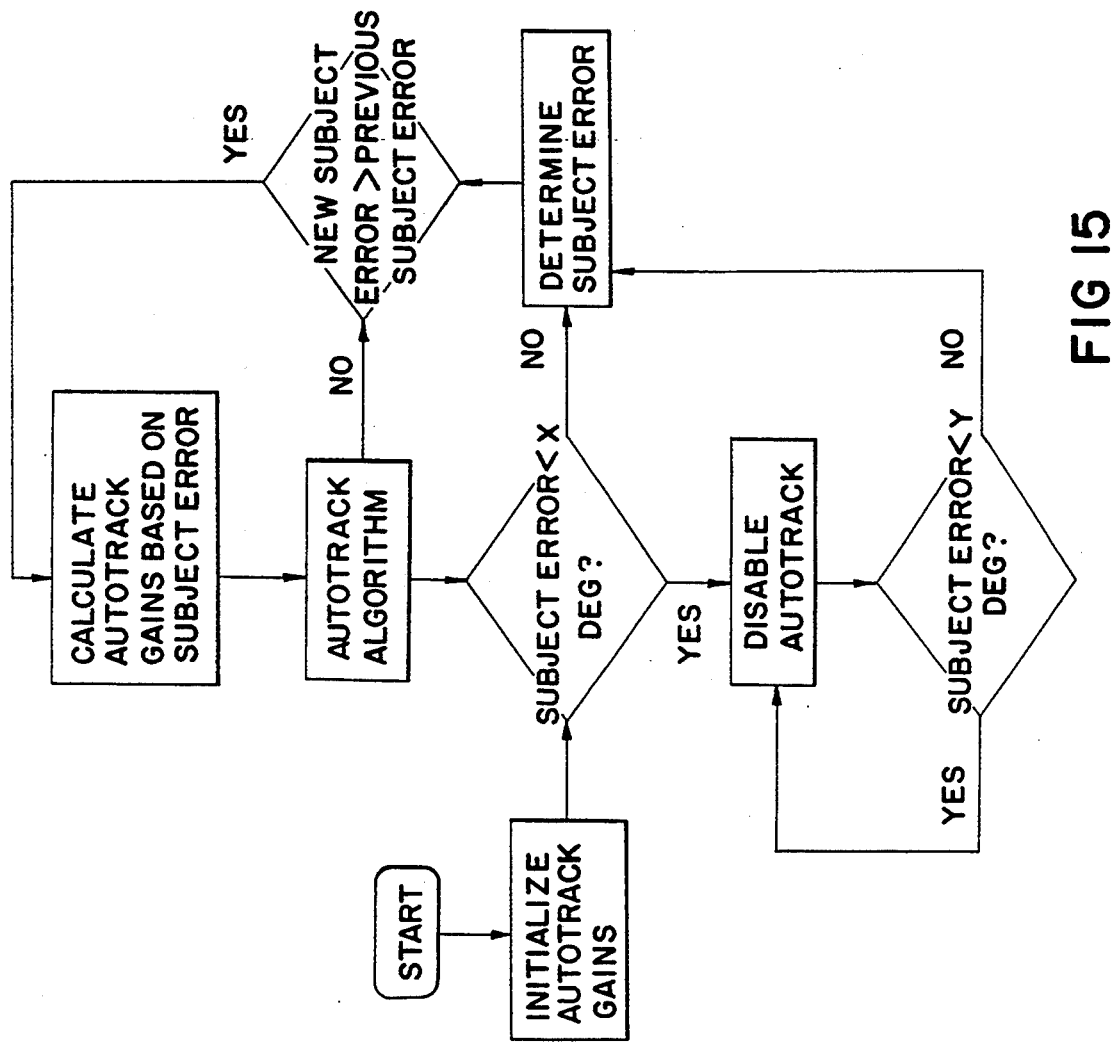

FIGS. 13 and 14 involve a step change in tracking response as the subject moves into a larger window FIG. 15 illustrates an approach whereby the response is increased continuously. This is preferred and is accomplished by monitoring the correct error as compared to a previous error and increasing the response if the current error is greater than the previous error. This amounts to a second order PID algorithm due to real time-based/error-based changes in the PID gains. The tracking response change is preferably linear but could be exponential, logarithmic or otherwise as desired. The greatest response selected is maintained until the error is eliminated at which time it is reset to the initial value. FIG. 15 illustrates tracking in all windows but as understood from the discussion hereinabove automatic tracking could be disabled in the center, smallest window.

STEALTH OPERATION

1. Stealth Command

Figure 16:
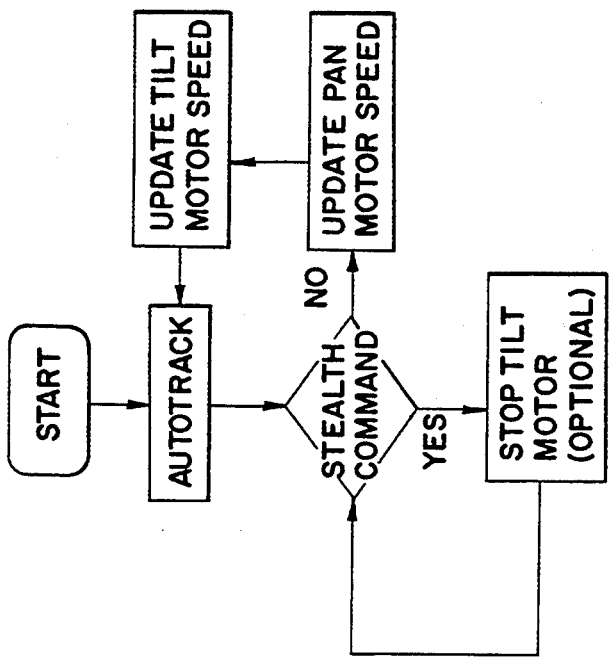

FIG. 16 illustrates one preferred STEALTH function wherein the PAN and TILT motion continues as it was as long as STEALTH button 78 is depressed. An optional feature provides for stopping the TILT motor 44 and continuing in only a PAN sweep in this STEALTH COMMAND mode.

2. Auto Stealth

Figure 17:
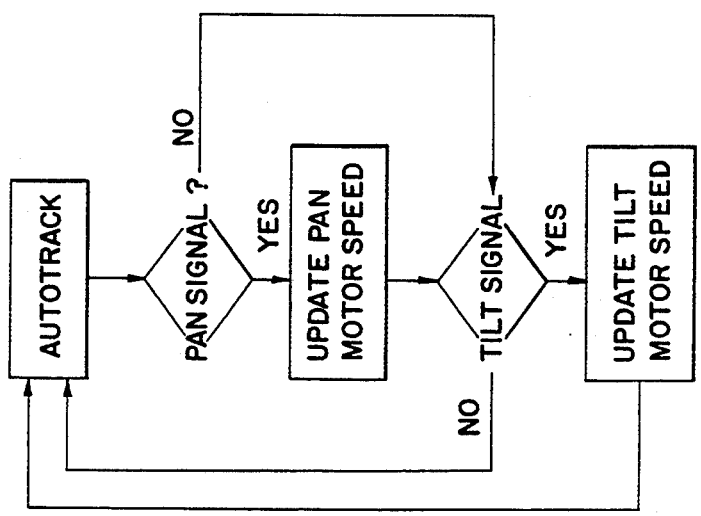

Another STEALTH function, the AUTO STEALTH mode, is illustrated in FIG. 17. This mode is actuated when the PAN and TILT return signals are not present. The STEALTH button 78 toggles this mode ON or OFF. When ON, button 78 is held depressed as the subject walks out of view. An option (not illustrated) provides for going to AUTO STEALTH mode when PAN only is lost with a freeze of the TILT motion. Loss of TILT only results in a freeze of TILT motion.

3. Time Delay Auto Stealth

Figure 18:
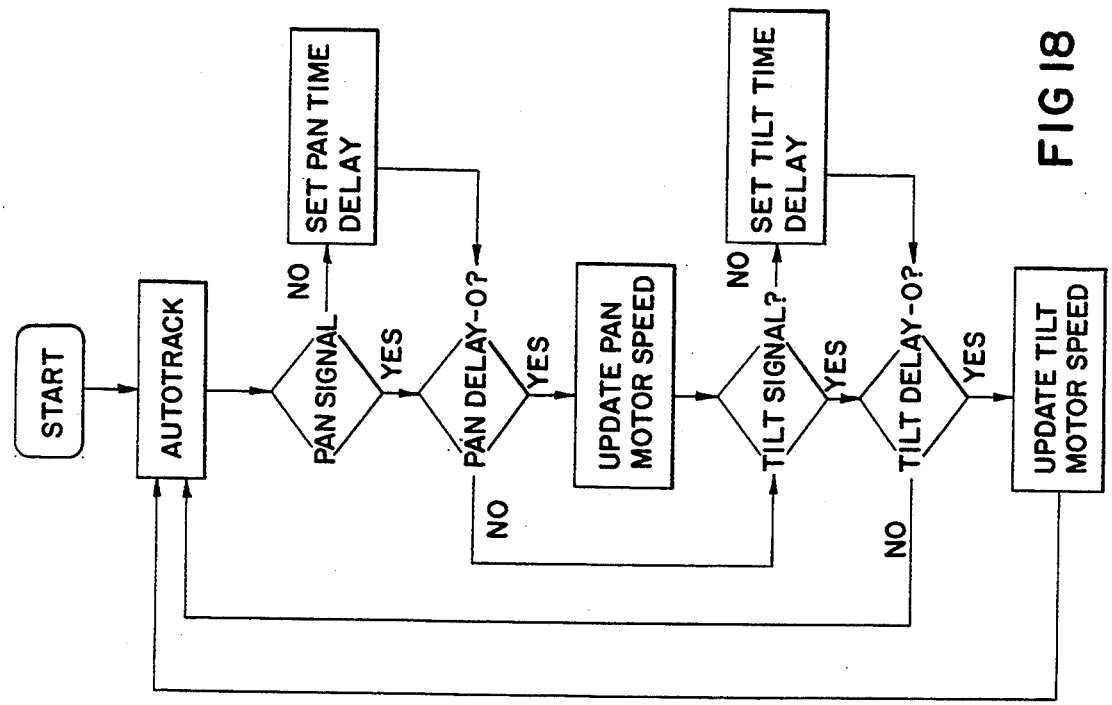

FIG. 18 describes the preferred AUTO STEALTH mode which includes a time delay to prevent momentary restart of the automatic tracking function if the PAN and TILT signals become intermittent as may be the case if the subject is walking behind a crowd of people.

The software for system operation is attached herein as Appendix "A".

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to secure by Letters Patent of the United States is:

1. A method of controlling the position of the field of view of a camera used to automatically track a subject with the field of view comprising the steps of:
   A. controlling the movement of the field of view of a camera;
   B. automatically tracking a subject with the field of view;
   C. selecting field of view positions of the camera;
   D. remembering the positions selected; and
   E. controlling the cessation of automatic tracking to return to any of the selected positions.

2. The method of claim 1 wherein step B includes the step of:
   F. selecting a field of view of the camera by controlling the position of the field of view of the camera to automatically track the subject with the field of view of the camera to any of the selected positions.

3. The method of claim 1 further including the step of:
   F. re-enabling the automatic tracking disabled in step E to begin automatic tracking of the subject by the field of view of the camera.

4. The method of claim 1 wherein step D includes the steps of:
   F. controlling the movement of the position of the field of view of the camera to move from a position remembered to another position remembered by controlling the movement of the field of view to automatically track the subject to the other selected position; and
   G. remembering the other position.

5. The method of claim 1 wherein step E includes the step of:
   F. controlling the position of the field of view of a camera to move from a selected position to another selected position.

6. The method of claim 5 further including the step of:
   G. adjusting the rate at which the position of the field of view is moved between a selected position and another selected position.

7. The method of claim 1 further including the steps of:
   F. controlling the perspective of the field of view to provide a selected perspective;
   G. adjusting the perspective of the field of view for a selected perspective of the field of view; and
   H. remembering a selected perspective of the field of view.

8. The method of claim 7 further including the step of:
   I. remembering the selected perspective of the field of view at the remembered selected position.

9. The method of claim 8 further including the step of:
   J. automatically recalling the selected perspective when the field of view returns to the selected position.

10. The method of claim 8 further including the step of:
    J. remembering a perspective associated with each position remembered.

11. The method of claim 10 further including the step of:
    K. automatically recalling the perspective associated with each position when each position is recalled in step E.

12. The method of claim 1 further including the steps of:
    F. controlling the cessation of automatic tracking of the subject in step B by the field of view by providing a Direction of Movement command to move the field of view in a direction as determined by the Direction of Movement command so as to control the field of view for determining a selected position.

13. The method of claim 12 further including the step of:
    G. maintaining cessation of automatic tracking until a command is issued to re-establish step B.

14. The method of claim 1 further including the step of:
    F. issuing a Speed command to adjust the rate at which the return to any of the selected and remembered fields of view occur in step E.

15. The method of claim 1 further including the step of:
    F. issuing a Speed Control command to adjust the rate at which the return to each selected and remembered field of view occurs in step E.

16. A method of controlling the field of view of a camera used to automatically track a subject with the field of view comprising the steps of:
    A. controlling the field of view of a camera;
    B. controlling the field of view to automatically track a subject with the field of view;

C. controlling the cessation of automatic tracking in step B of the subject by the field of view by providing a Direction of Movement command to move the field of view in a direction as determined by the Direction of Movement command.

17. The method of claim 16 wherein step C further includes the step of:
D. providing a Speed Control command to move the field of view at a specific rate.

18. The method of claim 16 further including the step of:
D. issuing a Speed command to adjust the rate at which the return to any of the selected and remembered fields of view which occur in step C.

19. The method of claim 17 wherein step C further includes the step of:
E. increasing or decreasing the rate of movement.

20. The method of claim 16 further including the step of:
D. providing a command to begin control of the field of view to automatically track the subject with the field of view of the camera.

21. A method of controlling the field of view of a camera used to automatically track a subject from the field of view with an automatic tracking device comprising the steps of:
A. controlling the field of view; and
B. controlling the field of view to automatically track the subject by the field of view; and
C. controlling the perspective of the field of view to provide a selected perspective; and
D. issuing commands to the tracking device to alter the perspective.

22. The method of claim 21 further including the steps of:
E. remembering at least one selected perspective of the field of view; and
F. recalling at least one selected perspective.

23. A method of controlling the field of view of a camera used to automatically track a subject with the field of view comprising the steps of:
A. controlling the field of view of a camera;
B. controlling the field of view to automatically track the subject by the field of view;
C. selectively remembering a first field of view of the camera;
D. selectively remembering a second field of view of the camera;
E. controlling the automatic tracking to cease automatic tracking in step B and to return to the first field of view; and
F. controlling the field of view to automatically return to the second field of view after a predetermined time period.

24. The method of claim 23 further including the step of:
G. controlling the field of view in step F such that when the field of view has returned to the second field of view the field of view is controlled to automatically return to the first field of view after a predetermined period;
H. controlling the field of view to automatically return to the second field of view after a predetermined time period; and
I. controlling the field of view to cycle between the first and the second field of views after waiting a predetermined time period at each selected and remembered field of view.

25. The method of claim 23 further including the step of:
G. controlling the field of view to automatically track a subject to the first field of view remembered in step C.

26. The method of claim 23 wherein step D includes the step of:
G. controlling the field of view to automatically track a subject to the second field of view of the camera.

27. The method of claim 23 wherein step C includes the step of:
G. selecting the first field of view by ceasing the automatic tracking of the subject by the field of view with a Direction of Movement command to move the field of view in a direction as determined by the Direction of Movement command so as to control the field of view for the purpose of selecting the first field of view.

28. The method of claim 23 wherein step D includes the step of:
G. selecting the second field of view by ceasing the automatic tracking of the subject by the field of view by providing a Direction of Movement command to move the field of view in a direction as determined by the Direction of Movement command so as to control the field of view for the purpose of determining the second field of view.

29. The method of claim 23 further including the step of:
G. issuing a Speed command to adjust the rate at which the return to the first selected and remembered field of view occurs in step E.

30. The method of claim 23 further including the step of:
G. issuing a Speed command to adjust the rate at which the return to the second selected and remembered field of view of the camera occurs in step F.

31. The method of claim 23 further including the step of:
G. issuing a Cycle command to accomplish steps E and F.

32. The method of claim 24 further including the step of:
J. issuing a Cycle command to accomplish steps E, F, G, H, and I.

33. The method of claim 31 further including the step of:
H. issuing a Stop Cycle command to countermand step G.

34. The method of claim 32 further including the step of:
K. issuing a Stop Cycle command to countermand step J.

35. The method of claim 23 further including the step of:
G. issuing a Time Period command which adjusts the predetermined time period established in step F.

36. The method of claim 24 further including the step of:
H. issuing a Time Period command which adjusts the predetermined time periods established for the first and second fields of view.

37. The method of claim 24 further including the steps of:
J. selecting additional fields of view of the camera to be remembered; and K. controlling the camera to continuously cycle between each remembered field of view after waiting a predetermined time period at each field of view.

38. The method of claim 37 wherein step J includes the step of:
   L. selecting the additional fields of view of the camera by controlling the field of view to automatically track a subject to the remembered additional fields of view.

39. The method of claim 37 further including the step of:
   L. selecting the additional fields of view of step J by controlling the-cessation of automatic tracking in step B of the subject by the field of view by providing a direction of movement command to move the field of view in a direction as determined by the direction of movement command so as to control the field of view for the purpose of selecting the additional fields of view.

40. The method of claim 37 further including the step of:
   L. issuing a Speed command to adjust the rate at which the return to the additional selected and remembered fields of view of the camera occurs.

41. The method of claim 37 further including the step of:
   L. issuing a Time Period command which adjusts the predetermined time period established in step F.

42. A method of controlling the field of view of a camera used to automatically track a subject with the field of view with an automatic tracking device comprising the steps of:
   A. controlling the field of view of a camera;
   B. controlling the field of view to automatically track the subject by the field of view; and
   C. issuing a first command to the automatic tracking device and to automatically move the field of view in the same direction and to discontinue automatic tracking of the subject by the field of view at generally the same rate of movement existing at the time the command was issued.

43. The method of claim 42 further including the step of:
   D. discontinuing the first command to the automatic tracking device to resume controlling the field of view to automatically track the subject with the field of view.

44. The method of claim 43 wherein step D includes the step of:
   E. discontinuing movement of the field of view if tracking of the subject is not possible.

45. A method of controlling the field of view of a camera used to automatically track a subject with the field of view with an automatic tracking device comprising the steps of:
   A. controlling the field of view of a camera to automatically track the subject by the field of view;
   B. issuing a command to the automatic tracking device for automatically moving the field of view until the subject can be automatically tracked; and
   C. automatically tracking the subject with the field of view of the camera when the subject can be automatically tracked.

46. The method of claim 45 wherein step C includes the step of:
   E. discontinuing movement of the field of view if a subject cannot be found in a predetermined amount of time or in a predetermined amount of movement of the field of view.

47. A method of controlling the field of view of a camera used to automatically track a subject with the field of view by an automatic tracking device and record images therein comprising the steps of:
   A. controlling the field of view of a camera;
   B. controlling the field of view to automatically track the subject in the field of view;
   C. recording the image in the field of view; and
   D. issuing commands to the automatic tracking device to control the starting or stopping of the recording of the field of view.

48. A method of controlling the field of view of a camera used to automatically track a subject with the field of view with an automatic tracking device comprising the steps of:
   A. controlling the field of view of a camera;
   B. controlling the field of view to automatically track a subject with the field of view; and
   C. controlling the functions of a camera by the automatic tracking device.

49. The method of claim 48 wherein step C includes the step of:
   D. remotely controlling the camera using commands to the automatic tracking device.

50. The method of claim 49 further including the step of:
   E. controlling the functions of a camera by programming in the automatic tracking device such that commands received by the automatic tracking device for controlling the operation of the functions of a camera will be remembered and controlled by the tracking device.

51. The method of claim 50 wherein step E includes the step of:
   F. controlling the field of view by programming to provide for the accepting and remembering of camera commands by the automatic tracking device for more than one camera wherein each camera has different camera commands for the same functions.

52. The method of claim 48 further including the step of:
   D. issuing commands to the automatic tracking device to control the functions of the camera.

* * * * *